May 3, 1966     F. SCRAGG ETAL     3,249,668

PROCESS AND APPARATUS FOR MANUFACTURING BRANCHED FILAMENTS

Filed Oct. 22, 1962

INVENTORS
Frederick Scragg
Alexander Albert Chubb
Timothy Nesbitt-Dufort
BY
Michael J. Striker
Atty.

3,249,668
PROCESS AND APPARATUS FOR MANUFACTURING BRANCHED FILAMENTS
Frederick Scragg, Mobberley, Cheshire, Alexander A. Chubb, Macclesfield, Cheshire, and Timothy Nesbitt-Dufort, Langley, near Macclesfield, Cheshire, England, assignors to Ernest Scragg & Sons Ltd., Macclesfield, England
Filed Oct. 22, 1962, Ser. No. 232,183
Claims priority, application Great Britain, Oct. 20, 1961, 37,642/61
6 Claims. (Cl. 264—147)

The present invention relates to the manufacture of man-made yarns, especially yarns composed of branched filaments.

An object of the present invention is to provide a method and apparatus according to which branched filaments can be formed from an extrusion in a rapid, economical manner providing a large output at minimum cost.

It is also an object of the present invention to provide a process and apparatus which render the manufacture of the branched filaments substantially continuous all the way from the initial extrusion of a suitable material to the winding of the branched filaments onto take-up packages.

A further object of the present invention is to provide a relatively simple, efficient and reliable apparatus which will be capable of operating continuously to produce an extrusion from which the branched filaments are subsequently formed.

The objects of the present invention also include the provision of an entire assembly for continuously manufacturing branched filaments from material which is suitable for extrusion.

With these objects in view the invention includes, in a process for manufacturing branched filaments, the steps of extruding an elongated plastic tube while simultaneously providing it with at least one spiral fin, although a plurality of helical fins are preferably provided, and subsequently slitting the thus-extruded tube longitudinally to form branched filaments having branches formed by sections of the spiral fins.

Also, with the above objects in view the invention includes an apparatus for manufacturing branched filaments, and the extruder means of this apparatus has an outlet end from which an extrusion issues, and the extruder means carries in its outlet end a block surrounded by the extrusion so as to form an elongated extruded tube, and at its outlet end the extruder means of the invention carries a rotary ring formed at its inner periphery with at least one notch, although a plurality of such notches are preferably provided. The extrusion material enters into the notches at the inner periphery of the rotary ring, and a rotating means is operatively connected to the ring to rotate the same so that simultaneously with the issue of the tube from the extruder means there will be formed on the tube a plurality of helical fins. Thereafter, the tube is slit longitudinally so that it can be flattened into a sheet having a plurality of fins extending diagonally thereacross, and then the sheet is longitudinally slit so as to form a plurality of filaments each having branches formed by sections of the helical fins.

The novel features which are considered as characteristic for the invention are set forth in particular in the appended claims. The invention itself, however, both as to its constructions and its method of operation, together with additional objects and advantages thereof, will be best understood from the following description of specific embodiments when read in connection with the accompanying drawings, in which:

Figure 1:
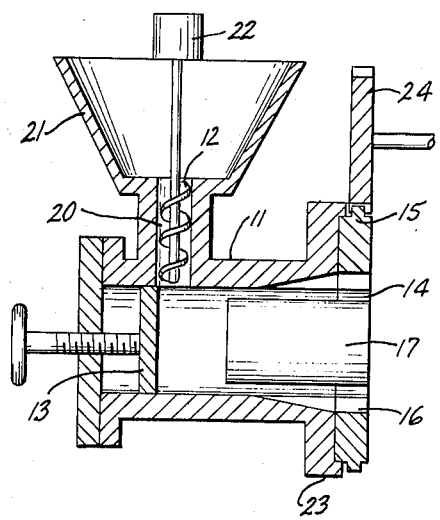
FIG. 1 is a longitudinal, sectional elevation, showing diagrammatically one possible embodiment of an extruder apparatus according to the invention.
Figure 2:
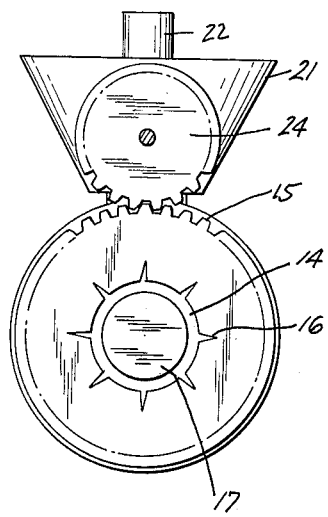
FIG. 2 is an end view of the structure of FIG. 1 as seen from the right of FIG. 1.
Figure 4:
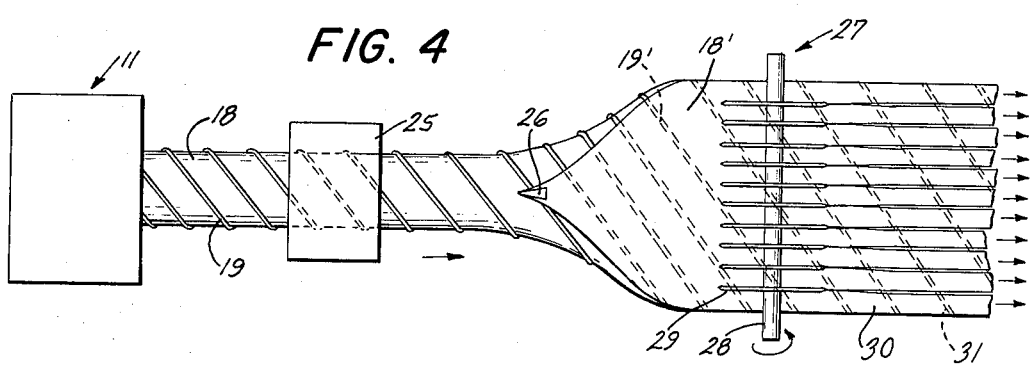
Figure 3:
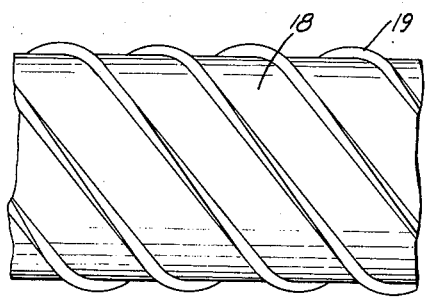

FIG. 3 fragmentarily illustrates a tube which is extruded with the apparatus of FIGS. 1 and 2; and FIG. 4 diagrammatically illustrates the arrangement and process for manufacturing branched filaments continuously in accordance with the present invention.

Referring to FIG. 1, the extruder means illustrated therein includes a elongated hollow cylinder 11 formed with an inlet 12 through which the extrusion material is introduced into the cylinder 11. An adjustable plate 13 in the interior of the cylinder 11 is shiftable axially of the cylinder 11 in the manner of a piston and can be positioned so as to determine the volume of the space within the cylinder 11 which receives the extrusion material. Within the inlet 12 is located a rotary worm screw 20 which feeds the material from a hopper 21 into the cylinder 11, and a suitable spider carried by the top of the hopper 21 supports a motor 22 which is operatively connected to the screw 20 so as to rotate the latter, and thus the material will be fed under pressure into the interior of the extrusion cylinder 11, and the material in the cylinder 11 will issue through the outlet 14 thereof. Within the outlet 14 of the extruder means is located a block 17 also of cylindrical configuration, and it will be noted that this block is spaced from the inner surface of the cylinder 11 so as to define therewith an annular passage through which the extrusion material issues, so that in this way an elongated tube can be continuously extruded by the extruder means. Suitable struts, which are not illustrated and about which the extrusion material moves, are fixed on the one hand to the block 17 and on the other hand to the inner surface of the cylinder 11 so that in this way the block 17 is supported in the interior of the cylinder 11.

In accordance with the present invention there is provided at the outlet end 14 of the extruder means a rotary ring 15, this ring being supported for rotation, for example, by a flange 23 formed integrally with the cylinder 11, and at its outer peripheral portion which is located beyond the flange 23 the ring 15 has gear teeth which mesh with a gear 24 driven by any suitable motor or the like at an appropriate speed, so that in this way the ring 15 will rotate during the extrusion of a tube from the extruder means 11. At its inner periphery the ring 15 is formed with at least one notch 16, preferably with a plurality of such notches, as indicated in FIG. 2, and the extrusion material enters into these notches 16. Thus, during the rotation of the rotary ring 15 simultaneously with the extrusion of a tube, the extruded tube will be formed at its exterior surface with a plurality of helical or spiral fins. FIG. 3 shows a tube 18 extruded with the apparatus of FIGS. 1 and 2 and provided at its exterior surface with a plurality of helical fins 19 which are similar to the multiple threads of a multiple-thread screw.

If desired, the block 17 can also be supported for rotation and it may be connected to a shaft which extends through the left end wall of the extruder, instead of the plate 13 and the adjusting screw therefore which would in this case be eliminated, and the rotary block 17 could be rotated by a suitable gear or pulley fixed to the shaft which extends through the left end wall of extruder, as view in FIG. 1 to the exterior thereto. The block 17 would in this case be formed with longitudinal grooves into which the extrusion material would enter, so that as a result of the rotation of the block 17 simultaneously with the extrusion of a tube, the tube would be provided with a plurality of helical fins at its interior surface, and of course such a structure of the block 17 could be combined with the ring 15 to provide a tube having helical fins at both its interior and its exterior surface.

FIG. 4 illustrates diagrammatically the manner in which it is possible to obtain branched filaments from the tube which is extruded from the extruder means of FIGS. 1 and 2, and with the structure of the invention illustrated in FIG. 4 it is possible to provide continuous manufacture of the branched filaments all the way from the extrusion of the tube 18 up to the winding of the branched filaments onto suitable take-up packages.

Referring to FIG. 4, the extruder means 11 is diagrammatically illustrated therein, and as is also diagrammatically shown in FIG. 4, the tube 18 as it issues from the extruder means passes through a suitable bath 25 which will treat the tubular extrusion according to the nature of the material thereof. Thus, depending upon the particular composition of the plastic material used to form the extrusion 18, the bath 25 can be provided for removal of solvent, or for acting as a coagulant, or for acting merely as a coolant.

In accordance with the present invention there is arranged in the path of movement of the tube 18 as it moves beyond the bath 25, a slitting means 26 in the form of a blade which is stationary and which longitudinally slits the tube in the manner indicated diagrammatically in FIG. 4. As the tube 18 continues to move to the left it will be longitudinally slit by the stationary blade 26 which simply is located to form a longitudinal cut through the wall of the extrusion 18, and subsequent to the blade 26 the extrusion 18 is flattened so as to form a sheet 18' which will of course have a plurality of diagonal fins 19' extending thereacross, these fins being formed by the plurality of helical fins 19. The stationary blade 26 may be replaced, if desired, by a rotary cutter. The flattened extrusion, now in the form of a sheet 18', reaches a second slitting means 27 in the form of a rotary shaft 28 driven from any suitable motor or the like and carrying a plurality of rotary cutters 29 which cut the sheet 18' into the plurality of elongated filaments 30 each of which is provided with branches 31 formed by sections of several fins 19', and the several filaments 30 are subsequently guided through suitable guides to suitably driven take-up packages onto which they are wound. Once the process and apparatus is set into operation the action of the cutters 29 and the rotary shaft 28 on the sheet 18' will serve to maintain the latter flat by the time it reaches the cutters 29, although suitable pressure rollers may be provided just in advance of the slitting means 27 for this purpose, if desired. It will be noted that with the process and apparatus shown in FIG. 4 a plurality of filaments 30 are formed in a fully continuous manner all the way from the initial extrusion of a suitable extrusion material into the tube 18 until the final winding of the filaments 30 onto the take-up packages.

Of course, it is possible to provide a plurality of slitting cutters 26 to provide from the tube 18 a plurality of longitudinal filaments without flattening of the tube 18 into the sheet 18', but the process and apparatus disclosed in FIG. 4 is preferred because it is possible with such an arrangement to locate the cutters 29 very close to each other so as to provide the filaments of suitably small cross section.

It will be understood that each of the elements described above, or two or more together, may also find a useful application in other types of yarn manufacturing process and apparatus differing from the types described above.

While the invention has been illustrated and described as embodied in process and apparatus for manufacturing branched filaments, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for continuously manufacturing branched filaments, the steps of continuously extruding a plastic tube while simultaneously providing it with at least one spiral fin; and thereafter cutting a plurality of closely spaced parallel slits in said plastic tube extending in the longitudinal direction thereof and intersecting said spiral fin so as to form simultaneously a corresponding plurality of filaments each having spaced branches formed by slit sections of said spiral fin.

2. In a process for continuously manufacturing branched filaments, the steps of continuously extruding a plastic tube while simultaneously providing the latter with a plurality of helical fins; and subsequently cutting a plurality of closely spaced parallel slits in said thus extruded plastic tube extending in longitudinal direction thereof and intersecting said helical fins so as to form simultaneously a corresponding plurality of filaments each having spaced branches formed by slit sections of said helical fins.

3. A process for continuously manufacturing branched filaments comprising the steps of continuously extruding a plastic tube while simultaneously providing it with a plurality of helical fins; continuously slitting the thus-extruded tube longitudinally and flattening the thus-slit tube to form an elongated flat sheet having thereon a plurality of fins extending diagonally across the sheet; and continuously cutting a plurality of closely spaced parallel slits in said sheet extending in longitudinal direction thereof so as to form a plurality of filaments each having branches formed by sections of the helical fins.

4. Apparatus for continuously manufacturing branched filaments, comprising, in combination, extruder means having a stationary hollow outlet end through which an extrusion issues and carrying a cylindrical block at said outlet end to form a tubular extrusion issuing from said outlet end of said extruder means; a rotary ring surrounding and spaced from said block at said outlet end of said extruder means and formed at its inner periphery with at least one notch into which the extrusion material enters; means operatively connected to said ring for rotating the same simultaneously with the extrusion of a tube from said outlet end of said extruder means, whereby the tube will be simultaneously provided with a helical fin during the extrusion thereof; and means for cutting a plurality of closely spaced parallel slits in said extruded plastic tube extending in longitudinal direction of said tube and intersecting said helical fin so as to form simultaneously a corresponding plurality of filaments each having branches formed by slit sections of said helical fin.

5. In an apparatus for continuously forming plastic branched filaments, in combination, extruder means having a stationary hollow outlet end from which an extrusion issues and carrying in said outlet end a block surrounded by the extrusion as the latter issues from said outlet end so that a tubular extrusion is formed; a rotary ring located at said outlet end of said extruder means and formed at its inner periphery with a plurality of notches distributed about the axis of said ring and into which the extrusion material enters during extrusion of a tube; means operatively connected to said ring for rotating the same simultaneously with the extrusion of a tube, whereby the tube will be formed with a plurality of helical fins; and means for cutting a plurality of closely spaced parallel slits in said extruded plastic tube extending in longitudinal direction of said tube and intersecting said helical fins so as to form simultaneously a corresponding plurality of filaments each having branches formed by slit sections of said helical fins.

6. In an apparatus for continuously forming branched filaments, in combination, extruder means having a stationary hollow outlet end from which an extrusion issues and carrying in said outlet end a block surrounded by the extrusion as the latter issues from said outlet end so that a tubular extrusion is formed; a rotary ring located at said outlet end of said extruder means and formed at its inner periphery with a plurality of notches distributed about the axis of said ring and into which the extrusion material enters during extrusion of a tube; means operatively connected to said ring for rotating the same simultaneously with the extrusion of a tube, whereby the tube will be formed with a plurality of helical fins; first slitting means located in the path of movement of the extrusion from the extruder means and slitting the same longitudinally as it moves from said extruder means so as to form a sheet which can be flattened and which will have a plurality of fins extending diagonally thereacross; and a plurality of closely spaced second slitting means engaging the flattened sheet and longitudinally slitting the same into a corresponding plurality of individual filaments each of which has a plurality of branches formed by sections of the helical fins.

References Cited by the Examiner

UNITED STATES PATENTS

| | | | |
|---|---|---|---|
| 2,573,050 | 10/1951 | Orsini | 264—75 |
| 2,809,393 | 10/1957 | Hauptman | 18—14 XR |
| 2,848,747 | 8/1958 | Dixon | 264—146 |
| 2,919,467 | 1/1960 | Mercer. | |
| 2,943,356 | 7/1960 | Rasmussen | 18—48 XR |
| 2,985,503 | 5/1961 | Becker | 18—54 |
| 3,059,277 | 10/1962 | Pierce et al. | 18—14 |
| 3,070,840 | 1/1963 | Mercer | 18—14 XR |

ROBERT F. WHITE, *Primary Examiner.*

WILLIAM J. STEPHENSON, *Examiner.*

C. B. HAMBURG, S. A. HELLER, *Assistant Examiners.*